(12) United States Patent
MacKlin et al.

(10) Patent No.: US 7,503,165 B2
(45) Date of Patent: *Mar. 17, 2009

(54) HYBRID PROPULSION SYSTEM

(75) Inventors: Frank MacKlin, Poway, CA (US); Chris Grainger, Poway, CA (US)

(73) Assignee: SpaceDev, Inc., Poway, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/049,344

(22) Filed: Feb. 1, 2005

(65) Prior Publication Data

US 2006/0064963 A1    Mar. 30, 2006

Related U.S. Application Data

(60) Provisional application No. 60/614,789, filed on Sep. 29, 2004.

(51) Int. Cl.
  *F02K 9/28*    (2006.01)
(52) U.S. Cl. ......................................... 60/251; 60/200.1
(58) Field of Classification Search .................... 60/251, 60/200.1
  See application file for complete search history.

(56) References Cited

U.S. PATENT DOCUMENTS

| | | | | |
|---|---|---|---|---|
| 3,298,182 A | * | 1/1967 | Webb ........................... | 60/251 |
| 3,354,647 A | * | 11/1967 | Aycock ........................ | 60/220 |
| 3,447,326 A | * | 6/1969 | Fuller .......................... | 60/251 |
| 3,507,296 A | | 4/1970 | Fix ............................... | 137/810 |
| 3,555,824 A | * | 1/1971 | Buse et al. ................... | 60/220 |
| 4,424,679 A | | 1/1984 | Holzman ...................... | 60/251 |
| 4,802,333 A | | 2/1989 | Smith ........................... | 60/260 |
| 4,880,185 A | | 11/1989 | Apfel ........................... | 60/259 |
| 5,010,730 A | | 4/1991 | Knuth et al. | |
| 5,026,259 A | | 6/1991 | Whitehead et al. ........... | 417/379 |
| 5,099,645 A | | 3/1992 | Schuler et al. | |
| 5,119,627 A | * | 6/1992 | Bradford et al. .............. | 60/251 |
| 5,339,625 A | | 8/1994 | McKinney et al. | |
| 5,572,864 A | | 11/1996 | Jones | |
| 5,579,636 A | * | 12/1996 | Rosenfield .................... | 60/251 |
| 5,582,001 A | * | 12/1996 | Bradford et al. .............. | 60/251 |
| 5,694,769 A | * | 12/1997 | Akiba et al. .................. | 60/251 |

(Continued)

OTHER PUBLICATIONS

Space Daily "Surrey fires micro electric thruster" Oct. 25, 1999.

(Continued)

*Primary Examiner*—William H Rodríguez
(74) *Attorney, Agent, or Firm*—Fred C. Hernandez; Mintz, Levin, Cohn, Ferris, Glovsky and Popeo, P.C.

(57) ABSTRACT

Disclosed is a propulsion system having a structural configuration that provides easy and convenient access to the interior regions of a liquid fuel tank and a hybrid rocket motor case. In one embodiment, the propulsion system comprises: a hybrid rocket motor case and a fuel tank coupled to the hybrid motor case. The motor case is configured to hold solid rocket fuel and the fuel tank defines an internal volume configured to hold a fluid oxidizer. A bulkhead is interposed between the motor case and the fuel tank, wherein at least one access passageway extends through the bulkhead. The access passageway provides exterior access to the interior volume of the motor case or the internal volume of the storage tank while the hybrid rocket motor is coupled to the fuel tank.

13 Claims, 6 Drawing Sheets

U.S. PATENT DOCUMENTS

| | | |
|---|---|---|
| 5,715,675 A | 2/1998 | Smith et al. |
| 6,092,366 A * | 7/2000 | Smith et al. .................... 60/251 |
| 6,250,072 B1 | 6/2001 | Jacobson et al. .............. 60/251 |
| 6,354,074 B1 * | 3/2002 | Jones et al. ................... 60/204 |
| 6,367,244 B1 | 4/2002 | Smith et al. |
| 6,393,830 B1 | 5/2002 | Hamke et al. ................. 60/229 |
| 6,601,380 B2 | 8/2003 | Knuth et al. |
| 6,640,536 B2 | 11/2003 | Kline et al. |
| 6,679,049 B2 * | 1/2004 | Kline et al. ................... 60/207 |
| 6,684,625 B2 | 2/2004 | Kline et al. |
| 6,880,326 B2 * | 4/2005 | Karabeyoglu et al. ......... 60/251 |
| 7,069,717 B2 | 7/2006 | Grainger et al. |
| 2002/0121081 A1 * | 9/2002 | Cesaroni et al. ............... 60/251 |
| 2003/0136111 A1 | 7/2003 | Kline et al. |
| 2005/0229583 A1 | 10/2005 | Macklin et al. ............... 60/204 |
| 2006/0213181 A1 * | 9/2006 | Sarigul-Klijn et al. ........ 60/251 |

OTHER PUBLICATIONS

Williams et al. "Almost There: Responsive Space" AIAA 2nd Responsive Space Conference 2004 RS2-2004-8000; Apr. 19-22, 2004; Los Angeles, CA.

* cited by examiner

HYBRID PROPULSION SYSTEM

RELATED APPLICATION

This application claims the benefit of priority to U.S. Provisional Patent Application Ser. No. 60/614,789, entitled "Hybrid Propulsion System", filed Sep. 29, 2004, which is incorporated herein by reference in its entirety.

TECHNICAL FIELD

This disclosure relates to propulsion systems, and more particularly to a hybrid propulsion system.

BACKGROUND

Liquid systems and solid systems are the two basic types of rocket propulsion systems that are generally used in the rocket industry. In a solid propellant system, solid rocket fuel and an oxidizer are mixed together and allowed to cure inside a rocket case to form a solid propellant material, which is then ignited in the rocket case. Upon ignition, pressure forms within the rocket case and gases are released through a nozzle to produce thrust. In a solid propellant system, the solid propellant burns uninterrupted until all the propellant is exhausted, which can be undesirable in certain circumstances. Solid systems can be quite complicated, and are subject to several requirements during manufacture in order to minimize safety risks during use. For example, the solid propellant must be crack-free, as propellant grains which contain cracks present a risk of explosive failure of the vehicle. Solid propellant systems can be inadvertently ignited by mechanical shock and static electricity. Consequently, the manufacturing process requires extreme safety precautions, which increases manufacturing costs.

In a liquid system, a liquid oxidizer is fed into a combustion chamber in combination with a liquid fuel. The oxidizer and liquid fuel are mixed in the combustion chamber, where they react to produce gases under high temperature and high pressure. The gases exhaust through a nozzle from the combustion chamber to thereby produce thrust. Although widely used, there are certain drawbacks associated with liquid propulsion systems. One such drawback is that the mixing of reactants requires a high performance pressurization system for the fuel and oxidizer, which can contributes to a high cost with respect to both money and maintenance. Like solids, a liquid system can also explode since the oxidizer and fuels can be inadvertently mixed together. Another drawback is that exotic—and therefore expensive—materials must be used for the various components of the system, which increases the monetary cost of the systems.

Another type of rocket propulsion system are the hybrid systems, which are generally not as widely used as liquid and solid rocket fuel systems. A hybrid system combines aspects of both liquid systems and solid systems in that one propellant is stored as a solid and another propellant is stored as a liquid. In a typical system, the solid material is used as the fuel and the liquid material is used as the oxidizer. A variety of materials can be used as the fuel, including Plexiglas (polymethyl methacrylate (PMMA)), high density polyethylene (HDPE), hydroxyl terminated polybutadiene (HTPB), etc. Nitrous Oxide is a commonly used as the oxidizer, although other oxidizers can be used.

Hybrid systems have characteristics that can be highly desirable for certain situations and uses. For example, a hybrid system generally has higher specific impulse than solid systems. Specific impulse is the change in momentum per unit mass for the rocket fuel. Thus, a hybrid system can generate a high level of "push" for each unit of fuel that is used. Another advantage associated with hybrid propulsion systems is the complete separability of the fuel from the principal oxidizer. This inhibits the potential for inadvertent ignition or catastrophic failure so that hybrid systems are inherently immune to inadvertent explosion. Yet another advantage is that hybrid systems have the ability to easily start, stop, and restart the combustion of the rocket fuel.

There is currently a need for improved hybrid propulsion systems.

SUMMARY

Disclosed is a propulsion system having a structural configuration that provides easy and convenient access to the interior regions of a liquid fuel tank and a hybrid rocket motor case. In one aspect, the propulsion system comprises: a hybrid rocket motor case having a proximal end and a distal end, the motor case defining an interior volume including a combustion chamber at the proximal end, wherein the motor case is configured to hold solid rocket fuel; a fuel tank coupled to the proximal end of the motor case, the fuel tank defining an internal volume configured to hold a fluid oxidizer; and a bulkhead interposed between the motor case and the fuel tank, wherein at least one access passageway extends through the bulkhead, the access passageway providing exterior access to the interior volume of the motor case or the internal volume of the storage tank while the hybrid rocket motor is coupled to the fuel tank.

In another aspect, the propulsion system comprises: a hybrid rocket motor case having a proximal end and a distal end, the motor case defining an interior volume including a combustion chamber at the proximal end, wherein the motor case is configured to hold solid rocket fuel; a fuel tank coupled to the proximal end of the motor case, the fuel tank defining an internal volume configured to hold a fluid oxidizer; and a bulkhead interposed between the motor case and the fuel tank, the bulkhead including means for providing exterior access to the interior volume of the motor case or the internal volume of the storage tank while the hybrid rocket motor is coupled to the fuel tank.

The details of one or more embodiments are set forth in the accompanying drawings and the description below. Other features, objects, and advantages of the invention will be apparent from the description and drawings, and from the claims.

DETAILED DESCRIPTION

Figure 1:
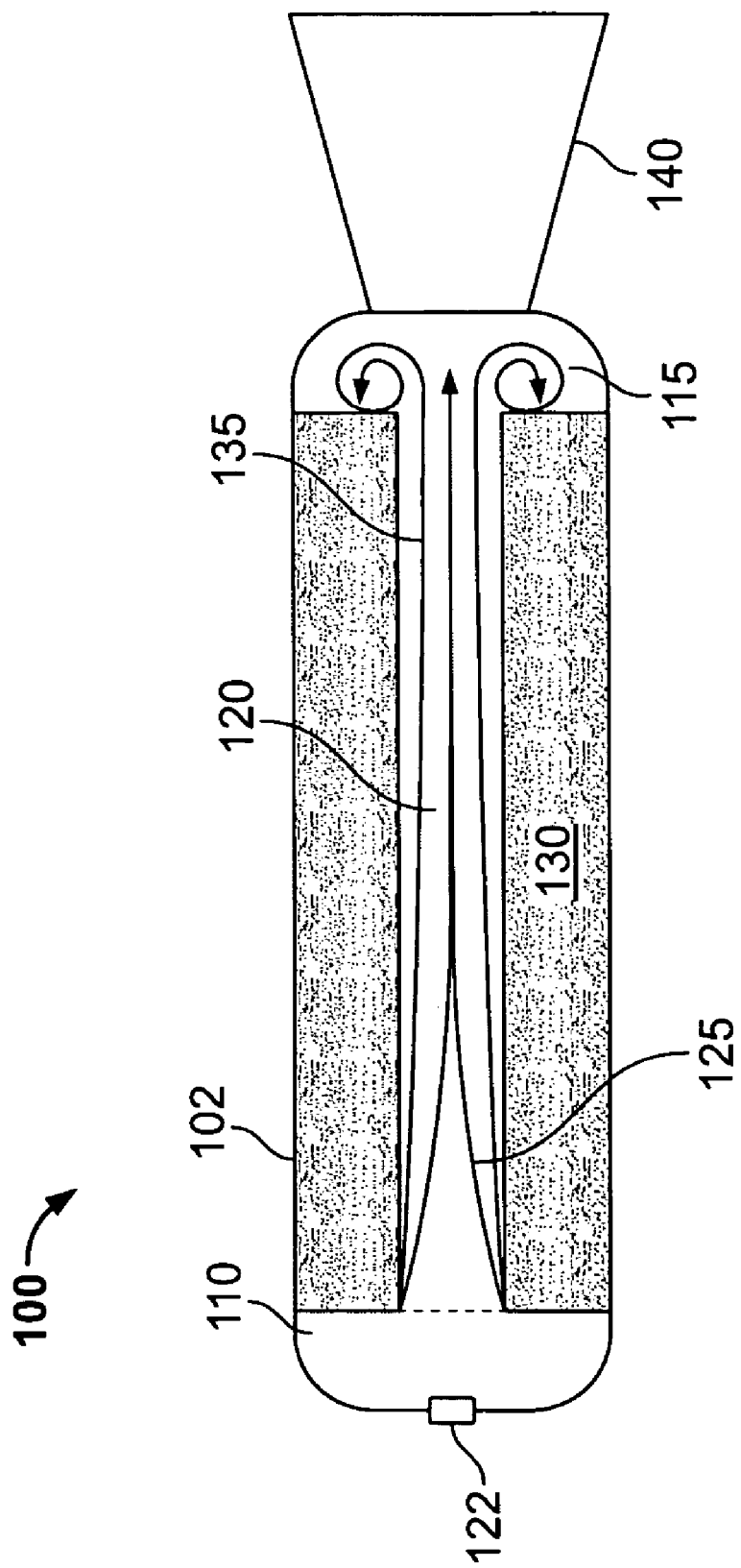
FIG. 1 is a schematic view of a single port hybrid rocket motor.

FIG. 1 shows a schematic of the configuration of a single port hybrid rocket motor 100. The motor 100 generally includes a main casing 102 that encloses a main chamber having a combustion chamber 110, a mixing chamber 115, and an elongate combustion port 120 extending therebetween. A solid fuel 130 is located within the main chamber. An injector 122 communicates with the combustion chamber 110 for injecting a liquid phase oxidizer into the combustion chamber 110. In use, the oxidizer is injected into the combustion chamber 110 via the injector 122. The injected oxidizer is gasified and flows axially along the combustion port 120, forming a boundary layer edge 125 over the solid fuel 130. The boundary layer edge 125 is usually turbulent in nature over a large portion of the length of the combustion port 120. A diffusion flame zone 135 exists within the boundary layer edge 125, which diffusion flame zone 135 extends over the entire length of the solid fuel 130.

The heat generated in the flame, which is located approximately 20-30% of the boundary layer thickness above the fuel surface, is transferred to the wall mainly by convection. The wall heat flux evaporates the solid fuel and the resultant fuel vapor is transported to the flame where it reacts with the oxidizer, which is transported from the free stream by turbulent diffusion mechanisms. The unburned fuel that travels beneath the flame, the unburned oxidizer in the free stream, and the flame combustion products mix and further react in the mixing chamber 115. The hot gases expand through a nozzle 140 to deliver the required thrust.

Figure 2:
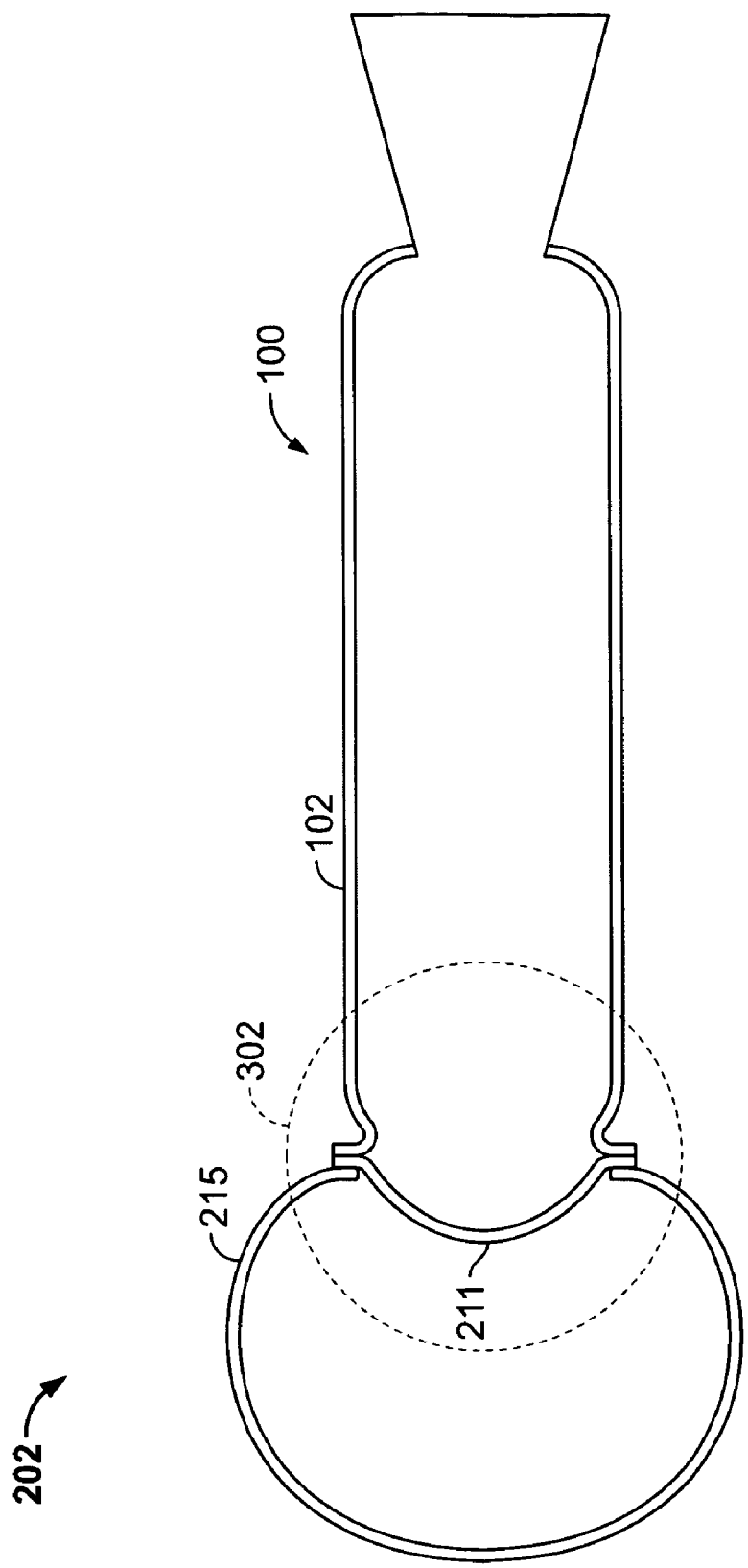
FIG. 2 is a schematic view of a first embodiment of a hybrid propulsion system.

A hybrid rocket motor 100 of the type shown in FIG. 1 can be incorporated into various types of propulsion systems. For example, FIG. 2 shows a hybrid propulsion system 202 having an elongate motor 100 attached to at least one storage tank 215 that holds a fluid oxidizer in a liquid phase. The motor 100 is at least partially configured as described above with respect to FIG. 1. In the illustrated embodiment, the casing 102 of the motor is attached at a first end to the storage tank 215 such that the nozzle 140 is spaced from the storage tank 215. In this manner, the motor extends outwardly from the storage tank 215. It should be appreciated that the shape of the storage tank can vary.

An intermediate structure, such as a bulkhead 211, is interposed between the casing 102 and the storage tank 215 and provides access to the interior of the casing 102 and the interior of the storage tank 215, as described more fully below. Advantageously, neither the casing nor the storage tank 215 has to be removed to gain access to the interior regions of the components. Rather, access to the interior of the storage tank 215 and the casing 102 is provided via passageways that extend through the bulkhead 211, as described more fully below. The bulkhead 211 can be attached to the storage tank 215 and the casing 102 in a variety of manners, such as, for example, bolts, screws, adhesive, clamps, etc., or combinations thereof.

Figure 3:
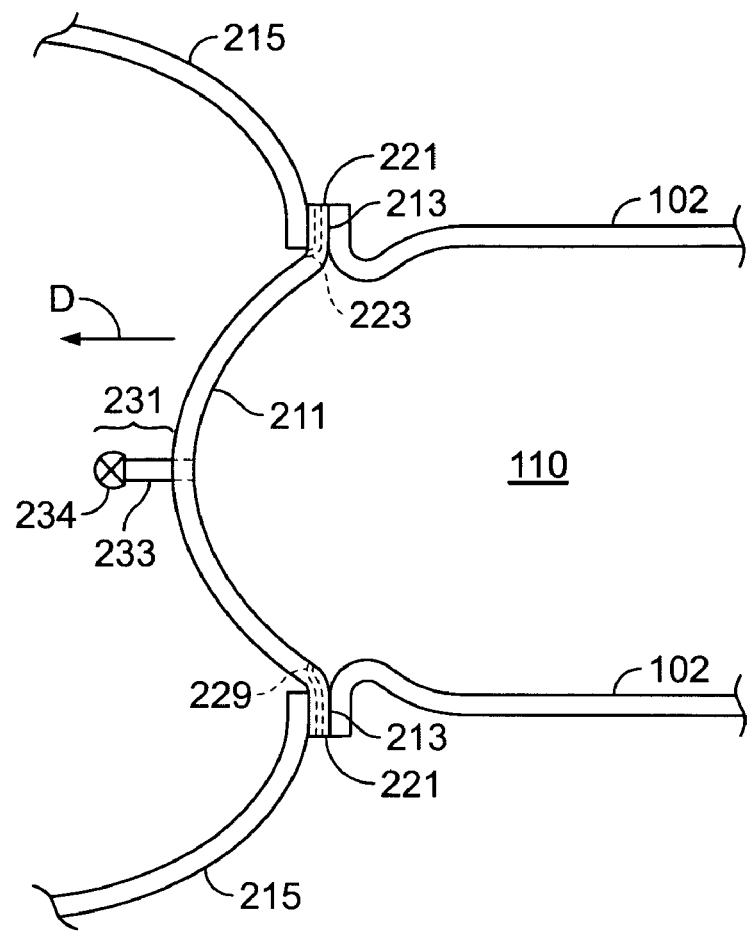
FIG. 3 is an enlarged view of a bulkhead boundary between a combustion chamber casing and an oxidizer storage tank of the system of FIG. 2.

FIG. 3 shows an enlarged, side view of the region of attachment between the storage tank 215 and the casing 102 contained in circle 302 in FIG. 2. With reference to FIG. 3, the bulkhead 211 is interposed between the casing 102 and the motor 100. The bulkhead 211 is substantially circular when viewed from the front. The bulkhead 211 has a circumferential flange 213 that extends around the entire circumference of the bulkhead 211 so as to form a region that can be attached to the casing 102 and the storage tank 215. Specifically, the flange 213 functions as a retaining region that can be used to attach the wall of the tank 215 to the wall of the casing 102 with the bulkhead 211 interposed therebetween. It should be appreciated that the bulkhead 211 sealingly engages the casing 102 and the storage tank 215. This prevents gases or any material from escaping from either the storage tank or the casing at any location along the attachment region between the bulkhead and the storage tank/casing.

As mentioned, a retaining means, such as bolts, screws, glue, etc., or combinations thereof, can be used to attach the tank 215 and the casing 102 to the flange 213 of the bulkhead 211. At least a portion of the bulkhead 211 has an outwardly-facing region, such as an outer wall 221, that can be accessed from the exterior of the rocket motor 100 and from the exterior of the storage tank 215. In the illustrated embodiment, the outer wall 221 comprises an outwardly-facing side wall of the flange 213. Thus, an operator or technician can access the outer wall 221 without having to remove either the storage tank 215 or the casing 102 from the bulkhead 211.

With reference still to FIG. 3, one or more access passageways extend through the bulkhead 211 to provide access to the interior of the storage tank 211 and/or the interior of the rocket casing 102 from a location exterior to the rocket motor. The access passageways extend through the bulkhead 211 to provide access to the interior of the casing 102 and/or to the interior of the storage tank 215 via the outwardly-facing sidewall 221 of the bulkhead 211.

In one embodiment, the passageways include at least one storage tank access passageway 223, which has at least a first opening in the outer wall 221 of the bulkhead 211 and at least a second opening that communicates with the interior of the storage tank 215. The configuration of the storage tank access passageway can vary. For example, the storage tank access passageway 223 can be a single passageway with no branches such that it has only one opening in the sidewall 221 and only one opening into the interior of the storage tank 215. Alternately, the storage tank access passageway 223 can have branches such that it has one or more openings in the side wall 221 and/or one or more openings into the storage tank 215. In this regard, the passageway can have one or more "forks" along its length.

In addition, the storage tank access passageway does not have to extend entirely through the bulkhead 211 along its entire length. Rather, at least a portion of the storage tank access passageway 223 can extend through the wall of the storage tank 215, as long the storage tank access passageway provides access to the interior of the storage tank 215 via the bulkhead 211. Any quantity of storage tank access passageways can be used.

With reference still to FIG. 3, the bulkhead 211 can also have at least one combustion chamber access passageway 229 which has at least a first opening in the outer wall 221 and at least a second opening that communicates with the interior of the casing 102. As discussed above with respect to the storage chamber access passageways 223, the configuration of the combustion chamber access passageway 229 can vary. For example, the combustion chamber access passageway 229 can be a single passageway with no branches such that it has only one opening in the sidewall 221 and only one opening into the interior of the combustion chamber 110. Alternately, the combustion chamber access passageway 229 can have branches such that it has one or more openings in the side wall 221 and one or more openings into the combustion chamber 110. In addition, the passageway does not have to extend entirely through the bulkhead 211 along its entire length, but can also extend through the wall of the casing 102 to provide access to the combustion chamber. Any quantity of combustion chamber access passageways can be used.

The access passageways 223, 229 provide convenient access to the interior of the storage tank 215 and to the combustion chamber 110. An elongate structure, such as a tubing or catheter, can be inserted through either of the passageways in a permanent or temporary manner, wherein the elongate structure can be equipped with sensors and/or visual aids that can be used to gather data regarding the interior of the storage tank and/or the combustion chamber. Advantageously, the storage tank 215 and the casing 102 do not have to be disattached from one another in order to gather such data, as the data is gathered via the appropriate access passageways through the bulkhead 211. The passageways can be plugged when not in use or can be equipped with valves or doors. In this manner, the storage tank 215 does not have to be removed from the bulkhead 211 or the rocket tube casing 102 in order to gain access to the interior of the storage tank 215. Likewise, the casing 102 does not have to be removed in order to gain access to the combustion chamber 110 in the casing interior. Rather, the passageways 223 and 229 provide such access through the bulkhead 211.

With further reference to FIG. 3, the bulkhead 211 forms a boundary between the combustion chamber 110 and the interior of the storage tank 215. An injection mechanism 231 is disposed within the storage tank 215 distal of the bulkhead 211. (The distal direction is represented by the arrow D in FIG. 3.) The injection mechanism includes an injector 233 that is configured to inject the oxidizer from the storage tank 215 into the combustion chamber 110 toward the solid fuel 130 (shown in FIG. 1). The injector 233 is coupled to a valve 234 that regulates the flow of oxidizer into the injector 233. An inlet is coupled to the valve 234 for directing oxidizer into the valve 234 and thereafter into the injector 233. It should be appreciated that the entire injection mechanism 231 is positioned within the storage tank 215 such that it is entirely submerged within the oxidizer that is located in the storage tank 215. In addition, the injection mechanism 231 is positioned distal of the combustion chamber 110 such that the injection mechanism 231 is outside the boundaries of the combustion chamber 110. This differs from a conventional injector (such as the injector 122 shown in FIG. 1), where the injector is at least partially positioned within the combustion chamber.

With reference still to FIG. 3, when the valve 234 is opened, the liquid oxidizer in the storage tank 215 flows into and through the injector 233 via the valve 234. The injector 233 injects the liquid oxidizer into the combustion chamber 110. As discussed above, the injected oxidizer is then gasified and flows axially along the combustion port of the combustion chamber 110. Resultant hot gases expand through the nozzle 140 to deliver the required thrust.

During the combustion process, the combustion chamber 110 achieves fluctuations or oscillations in pressure as the liquid oxidizer is gassified. In certain circumstances, it can be generally desirable to maintain the pressure oscillations at or below a predetermined percentage of a reference, such as lower than about 5 percent pressure oscillations. The reason for this is that increased pressure oscillations cause vibrations, which can lead to structural failure if the pressure oscillations increase to too high of a level. Applicant has observed that it can be advantageous to intentionally increase the pressure oscillations within the combustion chamber in order to achieve increased combustion instability within the combustion chamber 110. An increase in specific impulse of the rocket motor results when the pressure oscillations are increased to greater than about 5% within the combustion chamber 110. The increase in pressure oscillations can be accomplished by increasing the oxidizer flux, which is defined as the oxidizer flow rate divided by the cross-sectional area of the combustion chamber. Thus, it can be desirable in certain circumstances to increase the percentage of pressure oscillations in the combustion chamber and thereby increase combustion instability, which results in a greater specific impulse for the rocket motor.

Figure 4:
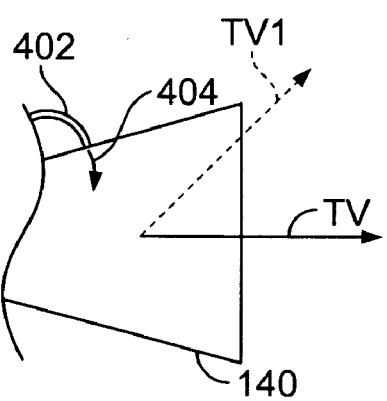
FIG. 4 is a schematic view of a nozzle of the system showing a liquid injection thrust vector control configuration

As discussed above, the rocket motor produces thrust as hot gases expand in a plume through the nozzle 140. With reference to FIG. 4, a resultant thrust vector TV is achieved relative to the nozzle 140. At least a portion of the liquid oxidizer from the storage tank 215 can be routed via a conduit into the nozzle 140 to provide control over the direction of the thrust vector relative to the nozzle 140. This is described in more detail with reference to FIG. 4. A conduit 402 provides a flow path for liquid oxidizer to flow from the storage tank 115 into the nozzle 140. In this regard, the conduit 402 can comprise a pathway or a series of interconnected pathways that extend from the storage tank 115 to the nozzle 140. It should be appreciated that one or more valves can be located along the conduit 402 so that an operator can selectively flow oxidizer from the storage tank 215 into the nozzle 140. In addition, more than one conduit 402 can be used to provide oxidizer flow into different regions of the nozzle 140.

During expansion of the hot gases through the nozzle 140, liquid oxidizer is flowed into a desired location in the nozzle through the conduit 140, as represented by the arrow 404 in FIG. 4. As the liquid oxidizer flows into the nozzle 140, it combusts within the hot gases. The combustion of the liquid oxidizer results in an increase in pressure, thereby forming a high pressure region within the nozzle 140 where the liquid oxidizer combusts. It should be appreciated that in the absence of the liquid oxidizer being injected into the nozzle 140, the resultant thrust vector will point in a predetermined direction, such as is represented by the thrust vector arrow TV in FIG. 4. However, the presence of the high pressure region resulting from the injection of the liquid oxidizer changes the direction of the resultant thrust vector, for example to the thrust vector TV1 in FIG. 4. In this manner, the liquid oxidizer can be used to vary the direction of the thrust vector relative to the nozzle 140. It should be appreciated that additional conduits 402 can be located to have outlets at various predetermined locations in the nozzle 140 so that liquid oxidizer can be selectively injected into the nozzle 140 to selectively vary the direction of the thrust vector.

Thus, there has been described at least two uses for the liquid oxidizer in the hybrid propulsion system. The first use is for combustion within the combustion chamber 110, which results in thrust through the nozzle 140. The second use is to provide control over the direction of the thrust vector by injecting liquid oxidizer into the nozzle 140. There is now described two additional uses for the liquid oxidizer, including using the liquid oxidizer for fine attitude control and using the properties of the liquid oxidizer to drive a pump that pumps the liquid oxidizer into the combustion chamber 110.

The use of the liquid oxidizer for fine attitude control is now described. This can be used, for example, to provide fine attitude control of a spacecraft that is coupled to the hybrid propulsion system. Such fine attitude control is described with reference to FIG. 5, which shows a schematic view of a hybrid propulsion module (HPM) 210 version of a hybrid propulsion system. It should be appreciated that the attitude control feature described herein can be incorporated into other embodiments of hybrid propulsion systems.

Figure 5:
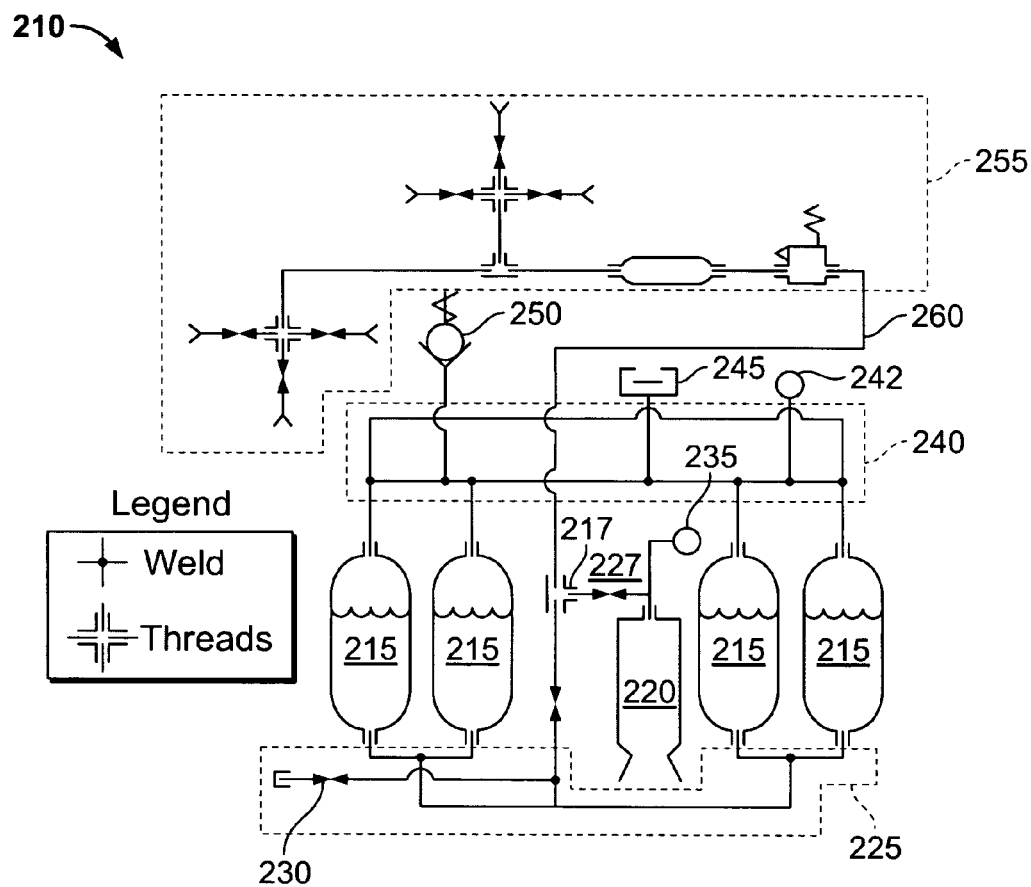
FIG. 5 is a schematic view of a hybrid propulsion system that employs a cold gas attitude and control system.

With reference to FIG. 5, the HPM 210 includes one or more oxidizer tanks 215 and a casing or tube 220 containing solid rocket fuel. Although the schematic in FIG. 5 shows four tanks 215, it should be appreciated that any quantity of tanks can be used. The tube 220 is configured according to the hybrid rocket motor configuration described above with respect to FIG. 1. That is, the tube 220 has an injector at one end (which communicates with the oxidizer tanks 215) and a nozzle at an opposed end. The tube 220 can be coupled to the storage tank 215 in the manner described above in FIG. 2 or it can be coupled in a different manner. Oxidizer in a liquid phase from the tanks 215 enters the tube 220 through the injector and combustion products emerge from the tank through the nozzle for generating thrust, as will be known to those skilled in the art. At least one igniter (not shown) is coupled to the tube 220 for igniting the liquid fuel within a combustion chamber of the tube 220, as described above.

An aft manifold system 225 (comprised of one or more conduits through which the oxidizer can flow) couples each of the oxidizer tanks 215 to a motor conduit 217. The manifold system 225 and the motor conduit 217 collectively provide at least one pathway through which oxidizer can travel into the tube 220 from the tanks 215. As mentioned, an injector (not shown) is positioned at the entryway to the tube 220 in between the motor conduit 217 and the tube 220 for injecting oxidizer from the oxidizer tanks 215 into the tube 220. As mentioned, the tube 220 is configured as described above with reference to FIG. 1.

A pressure transducer 235 is coupled to the motor conduit 217. In addition, a main feed solenoid valve 227 is positioned along the motor conduit 217 and provides a means to control the flow of oxidizer from one or more of the tanks 215 to the tube 220. An access device 230 comprising a valve is included within or coupled to the aft manifold system 225 to provide access to the oxidizer tanks 215 for filling or draining the tanks.

With reference still to FIG. 5, a fore manifold system 240 is also coupled to each of the oxidizer tanks 215. The fore manifold system 240 is comprised of one or more interconnected conduits through which fluid oxidizer can flow from the tanks 215. As used herein, the term "conduit" means any pathway or lumen through which fluid can flow and includes pipes, tubes, etc. that can be made of any of a plurality of suitable materials. The fore manifold system includes a pressure transducer 242, a burst disk 245, and a relief valve 250. As described below, the fore manifold system provides a pathway through which oxidizer from one or more of the tanks 215 can flow to an attitude control system of the HPM 210.

In one embodiment, the oxidizer tanks 215 house a liquid oxidizer comprised of Nitrous Oxide ($N_2O$). Those skilled in the art will appreciate that Nitrous Oxide is self-pressurizing at room temperature. Accordingly, the high vapor pressure of the Nitrous Oxide can be utilized in the oxidizer tanks to transport the Nitrous Oxide to the tube 220 via the aft manifold 225 and motor conduit 217 without the use of pumps or a pressurization system. Those skilled in the art will appreciate that other types of liquid oxidizers can also be used. The oxidizer can be stored in the tanks 215 within a temperature range such that it exists simultaneously in both a liquid phase and a gas phase. In the case of Nitrous Oxide being used as an oxidizer, the Nitrous Oxide is stored in the tanks 215 at a temperature range of approximately 0 degF. to 80 degF. and at a pressure of approximately 280 psia to 865 psia. Such a range of pressures and temperatures is sufficient to maintain the Nitrous Oxide within the tanks in both a liquid phase and a gas phase. It should be appreciated that the pressure and temperature ranges can vary based on the substance in the tanks.

In one embodiment, the solid fuel comprises polymethylmethacrylate, although other materials can be used as the solid fuel.

As mentioned above, the hybrid propulsion module 210 further includes an attitude control system (ACS) 255, which is schematically represented by a phantom box in FIG. 5 and described in more detail below with reference to FIG. 6. In one embodiment, an ACS conduit 260 is coupled to the aft manifold system 225. Alternately the ACS conduit may be coupled to the fore manifold system 240. Thus, the ACS conduit 260 and the aft manifold system 225 collectively provide a pathway for the oxidizer to flow to the ACS 255 from one or more of the oxidizer tanks 215. The ACS conduit 260 provides a pathway for liquid oxidizer to flow to the ACS 255 from one or more of the oxidizer tanks 215. In this regard, the ACS conduit 260 is fluidly coupled to the fore manifold system 240.

Figure 6:
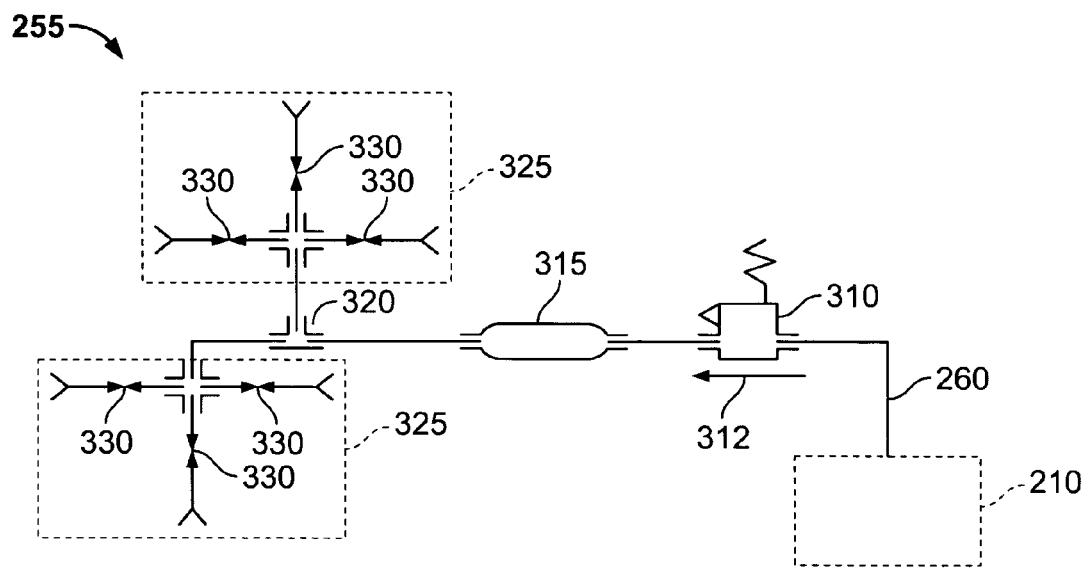
FIG. 6 shows a schematic view of a first embodiment of a cold gas attitude and control system.

FIG. 6 shows an enlarged, schematic view of a first embodiment of the ACS 255 (the remainder of the HPM 210 is represented by a phantom box 210 in FIG. 5). As discussed, the ACS conduit 260 provides a pathway for liquid fuel to flow from the one or more of the oxidizer tanks 215 into the ACS 255. A pressure regulator 310 is located along the ACS conduit 260, such as at the entryway into the ACS 255. The pressure regulator 310 is configured to regulate the downstream pressure of liquid fuel flowing through the main ACS conduit 260, as described in more detail below. The "downstream" direction is the direction toward the ACS thrusters from the tanks 215 and is represented by the arrow 312 in FIG. 6. The term downstream is also used to denote relative location. For example, a first item or state that is located "downstream" of a second item or state is located in the downstream direction relative to the second item or state. The term "upstream" is the opposite of downstream.

An accumulator 315 can be located along the ACS conduit 260 downstream of the pressure regulator 310 such that the oxidizer (such as Nitrous Oxide) is regulated by the pressure regulator 310 into the accumulator 315. The accumulator 315 functions to reduce or eliminate pressure fluctuations in gas supplied to the thrusters downstream of the accumulator.

At a location 320, the ACS conduit 260 branches into at least one thruster system 325 located downstream of the pressure regulator. Each thruster system 325 includes one or more thrusters 330, wherein the thrusters are fed by the accumulator 315. In the illustrated embodiment, each thruster system 325 includes three thrusters 330 comprised of solenoid thrusters that are arranged in a triad configuration, which is described in more detail below. However, it should be appreciated that the quantity of thrusters 330 per thruster system 325 and the number of thruster systems 325 can vary. For example, each thruster system 325 can include a single thruster 330, two thrusters 330, or three or more thrusters 330.

For the first embodiment, a thrust level of approximately 0.5 lbf is envisioned, which can be tailored by adjusting regulator set pressure. The thruster is envisioned as an on-off solenoid valve closely coupled with a nozzle of appropriate size and expansion ratio. It should be appreciated that the thrust level and the configuration of the thrusters can vary.

In one embodiment, the thrusters 330 do not produce thrust through combustion, but rather produce thrust through the expansion of cold gas expelled from the thrusters. In this system, the cold gas is obtained from the tanks 215 such that the same material that is used as the oxidizer for the rocket motor is also used as the cold gas for achieving thrust in the ACS 255. A cold gas propulsion system is desirable for fine attitude control, as such a system can provide a small minimum impulse bit. In addition, such a system is highly reliable and safe in operation.

As mentioned, the tanks 215 can store the oxidizer simultaneously in both a liquid phase and a gas phase, such as in the case of Nitrous Oxide being used as the oxidizer. In this regard, it is desirable that all of the oxidizer reach the thrusters 330 solely in a gas phase and that none of the oxidizer is in the liquid phase during expulsion from the thrusters 330. It is generally undesirable for the thrusters 330 to expel oxidizer in a liquid form. In other words, the oxidizer should be in a gas phase upstream of the thrusters 330 such that the oxidizer enters the thrusters 330 in the gas phase. Toward this end, the pressure regulator 310 has a set point that is below the pressure that the oxidizer can exist in a liquid state for a given temperature, wherein the given temperature is the temperature of the oxidizer at a location upstream of the thrusters and downstream of the pressure regulator 310, such as the temperature in the accumulator. This ensures that the oxidizer is in a gas phase and will not be in a liquid phase upstream of the thrusters.

In one embodiment, the temperature of the oxidizer contained in the accumulator determines the regulator set point pressure. The pressure regulator is set for a pressure that is lower than the vapor pressure of the particular oxidizer at the lowest temperature of the accumulator. Thus, the pressure regulator ensures that the oxidizer will be in a gas phase in the accumulator by regulating the oxidizer pressure to a pressure that is below the vapor pressure of the oxidizer for the lowest temperature in the accumulator. Pressure regulation of the oxidizer flowing through the ACS conduit to a pressure below the oxidizer's vapor pressure at the accumulator temperature ensures that liquid will not be ejected from the thrusters 330. It should be appreciated that the pressure to which the regulator 310 regulates the pressure can vary based upon the oxidizer that is being used in order to maintain the particular oxidizer in the gas phase upstream of the thrusters 330. To increase the quality of the vapor downstream of the regulator, heat may be added rather than relying on ambient heat capacity of the surroundings.

Figure 7:
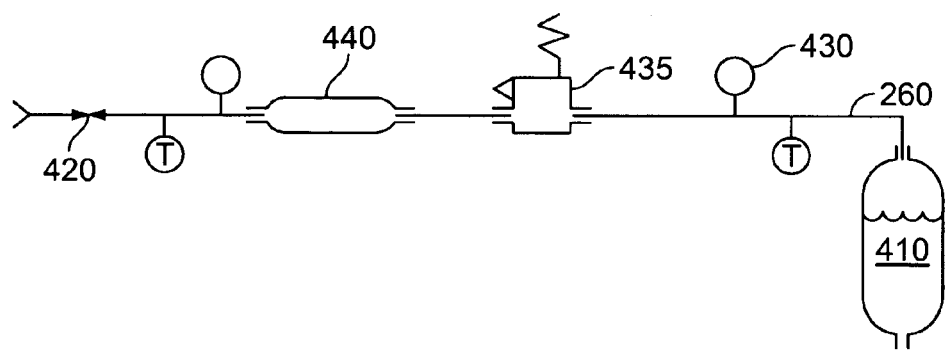
FIG. 7 shows a schematic view of a first embodiment of a cold gas attitude and control system.

FIG. 7 shows a simplified version of the ACS system, wherein a single oxidizer tank 410 is coupled to a single thruster 420 via an ACS conduit 260. A pressure transducer 430, pressure regulator 435, and an accumulator 440 are located in series along the ACS conduit 260. The configuration shown in FIG. 7 is similar to that shown and described with respect to FIG. 6 although the number of components has been reduced.

Figure 8:
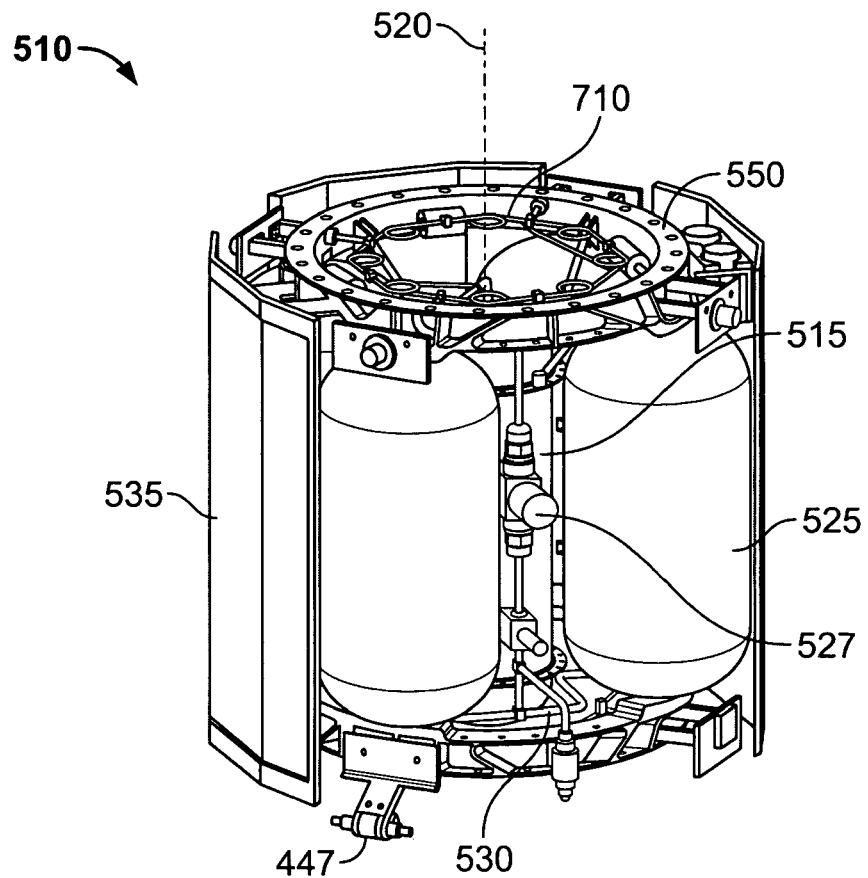
FIG. 8 is a perspective view of the MTV.

As mentioned, the HPM 210 can be incorporated into a maneuvering and transport vehicle (MTV) that can be used, for example, to transport a payload from a drop-off orbit to an operational orbit in space. FIG. 8 shows a perspective, partial cutaway view of one embodiment of an MTV 510 that incorporates the HPM 210. The MTV 510 is generally cylindrical, cubic or hexagonal in shape and includes a central motor 515 that is aligned along a longitudinal axis 520. The motor 515 is configured similarly to the motor shown and described above with reference to FIG. 1. A plurality of oxidizer tanks 525 are arranged in an annular configuration around the central motor 515 and the longitudinal axis 520. In one embodiment, there are four tanks 525 disposed around the motor 515. However, it should be appreciated that any quantity of tanks 525 can be employed. A flow control valve 527 is coupled to an aft manifold system 530 that couples the oxidizer tanks 525 to the motor 515. A plurality of solar array panels 535 can be located on the MTV 510. For clarity of illustration, the solar panels are not shown in FIG. 8.

With reference still to FIG. 8, a fore manifold system 710 is located on an upper region of the MTV 525 above the tanks. The fore manifold system 710 includes a plurality of conduits that provide pathways for liquid fuel to flow out of the tanks 525. In one embodiment, at least one gas thruster 447 is coupled to the fore manifold system via another conduit (not shown). The at least one gas thruster 447 is part of an ACS system of the MTV 510, wherein the ACS system is configured according to the system described above with reference to FIGS. 5 and 6.

In one embodiment, the MTV has a height of approximately 20 inches and a width of approximately 22 inches.

Figure 9:
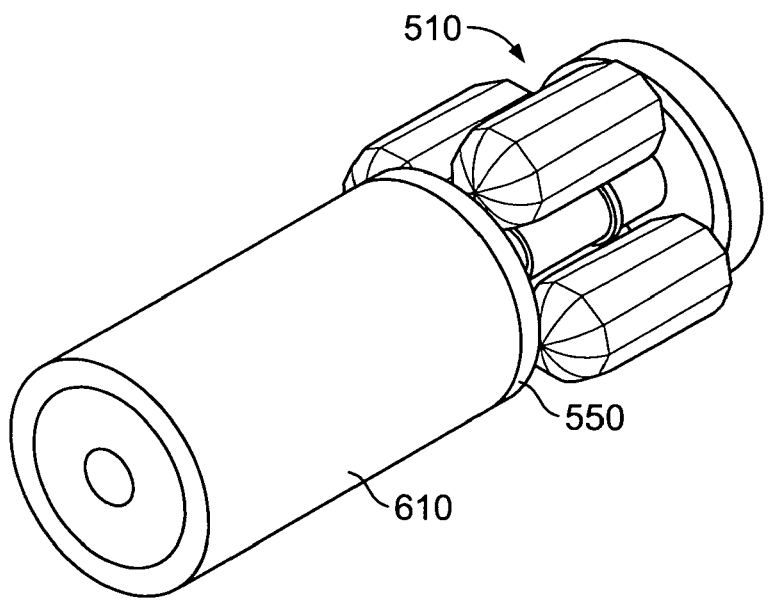
FIG. 9 is a perspective view of the MTV coupled to a payload.

With reference to FIG. 8, the MTV 510 further includes a payload interface 550 that is located on a forward end of the MTV 510. The payload interface 550 comprises a coupling device or mechanism that is used to attach a payload to the MTV. In the illustrated embodiment, the payload interface comprises an annular structure having a plurality of attachment points that can be used to attach the MTV 510 to a payload, such as, for example, a satellite. FIG. 9 shows a schematic view of the MTV 510 attached to a payload 610. In the illustrated embodiment, the payload 610 comprises a satellite. However, it should be appreciated that the other devices can be attached to the MTV 510.

There is now described yet another use for the oxidizer in a hybrid propulsion system. According to this use, the oxidizer from the storage tank(s) 215 in FIGS. 2 or 5 is used to drive a turbopump that is used to pump the oxidizer into the combustion chamber 110. An outlet of the storage tank 215 is coupled to the turbopump having a turbine that is coupled to a turbine shaft. The shaft, when rotated, pressurizes a pump that is also coupled to an outlet of the storage tank 215. The pump can be used to pump oxidizer from the storage tank 215 into the combustion chamber 110 of a rocket motor. Thus, the oxidizer (which is at least partially in a liquid state when in the tank 215) is routed out of the tank 215 and allowed to decompose into high temperature and high pressure gas state. The oxidizer is then expanded through a turbine so as to rotate the turbine, which in turn rotates the shaft coupled thereto to power the pump. The pump then pumps the oxidizer into the combustion chamber. It should be appreciated that there have been described two or more, three or more, and four or more uses for the oxidizer in a hybrid propulsion system.

A number of embodiments of the invention have been described. Nevertheless, it will be understood that various modifications may be made without departing from the spirit and scope of the invention. Accordingly, other embodiments are within the scope of the following claims.

What is claimed is:

1. A propulsion system, comprising:
a hybrid rocket motor case having a proximal end and a distal end, the motor case defining an interior volume including a combustion chamber at the proximal end, wherein the motor case is configured to hold solid rocket fuel;
a fuel tank coupled to the proximal end of the motor case, the fuel tank defining an internal volume configured to hold a fluid oxidizer;
a partition interposed between the motor case and the fuel tank, wherein at least one access passageway extends through the partition, the access passageway providing exterior access to the interior volume of the motor case or the internal volume of the fuel tank while the hybrid rocket motor is coupled to the fuel tank,
wherein the at least one access passageway comprises a motor case access passageway, the motor case access passageway having a first opening in communication with the interior volume of the motor case and a second opening in an external wall of the partition and wherein the first opening communicates with the combustion chamber.

2. The system of claim 1, wherein the at least one access passageway comprises a fuel tank access passageway, the fuel tank access passageway having a first opening in communication with the internal volume of the fuel tank and a second opening in an external wall of the partition.

3. The system of claim 1, wherein the partition comprises a bulkhead flange sandwiched between corresponding flanges of the motor case and the fuel tank.

4. The system of claim 3, wherein the bulkhead flange has an outwardly-facing sidewall and wherein the at least one access passageway has at least one external opening in the outwardly-facing sidewall of the bulkhead flange.

5. The system of claim 4, wherein the at least one access passageway has a plurality of openings in the outwardly facing sidewall.

6. The system of claim 1, further comprising an injector configured to inject fluid oxidizer from the fuel tank into the motor case, wherein the injector is entirely positioned within the fuel tank on a first side of the partition.

7. The system of claim 1, wherein at least one valve is positioned in the access passageway.

8. The system of claim 1, wherein the access passageway includes a removable plug.

9. A propulsion system, comprising:
a hybrid rocket motor case having a proximal end and a distal end, the motor case defining an interior volume including a combustion chamber at the proximal end, wherein the motor case is configured to hold solid rocket fuel;
a fuel tank coupled to the proximal end of the motor case, the fuel tank defining an internal volume configured to hold a fluid oxidizer;
a partition interposed between the motor case and the fuel tank, the partition including means for providing exterior access to the interior volume of the motor case or the internal volume of the fuel tank while the hybrid rocket motor is coupled to the fuel tank
wherein the partition comprises a bulkhead flange sandwiched between corresponding flanges of the motor case and the fuel tank and wherein at least one access passageway has a plurality of openings in an outwardly facing sidewall.

10. The system of claim 9, wherein the means for providing exterior access comprises at least one access passageway that extends through the partition.

11. The system of claim 9, further comprising an injector configured to inject fluid oxidizer from the fuel tank into the motor case, wherein the injector is entirely positioned within the fuel tank on a first side of the partition.

12. A propulsion system, comprising:
a hybrid rocket motor case having a proximal end and a distal end, the motor case defining an interior volume including a combustion chamber at the proximal end, wherein the motor case is configured to hold solid rocket fuel;
a fuel tank coupled to the proximal end of the motor case, the fuel tank defining an internal volume configured to hold a fluid oxidizer;
a partition interposed between the motor case and the fuel tank, wherein at least one access passageway extends through the partition, the access passageway providing exterior access to the interior volume of the motor case or the internal volume of the fuel tank while the hybrid rocket motor is coupled to the fuel tank,
wherein the partition comprises a bulkhead flange sandwiched between corresponding flanges of the motor case and the fuel tank and wherein the bulkhead flange has an outwardly-facing sidewall and wherein the at least one access passageway has at least one external opening in the outwardly-facing sidewall of the bulkhead flange.

13. A propulsion system, comprising:
a hybrid rocket motor case having a proximal end and a distal end, the motor case defining an interior volume including a combustion chamber at the proximal end, wherein the motor case is configured to hold solid rocket fuel;
a fuel tank coupled to the proximal end of the motor case, the fuel tank defining an internal volume configured to hold a fluid oxidizer;
a partition interposed between the motor case and the fuel tank, wherein at least one access passageway extends through the partition, the access passageway providing exterior access to the interior volume of the motor case or the internal volume of the fuel tank while the hybrid rocket motor is coupled to the fuel tank,
wherein at least one valve is positioned in the access passageway.

* * * * *